| United States Patent | [15] | 3,689,523 |
| --- | --- | --- |
| Trancik et al. | [45] | Sept. 5, 1972 |

[54] SUBSTITUTED HALOALKANESULFONANILIDES

[72] Inventors: Ronald J. Trancik, White Bear Lake; George G. I. Moore, Birchwood; Joseph Kenneth Harrington, Edina, all of Minn.

[73] Assignee: Minnesota Mining and Manufacturing Company, St. Paul, Minn.

[22] Filed: Jan. 4, 1971

[21] Appl. No.: 103,802

Related U.S. Application Data

[63] Continuation-in-part of Ser. No. 28,130, April 13, 1970, abandoned.

[52] U.S. Cl..............260/470, 71/103, 260/479 R, 260/556 A, 260/556 F, 260/556 AC, 424/300, 424/311, 424/321
[51] Int. Cl..............................................C07c 143/74
[58] Field of Search..............260/470, 479 R, 556 A 556 AC, 556 F

[56] References Cited

UNITED STATES PATENTS 3,576,866  4/1971  Robertson et al. ........260/556
3,609,187  9/1971  Moore et al. ...........260/556 F

*Primary Examiner*—Henry R. Jiles
*Assistant Examiner*—G. Thomas Todd
*Attorney*—Kinney, Alexander, Sell, Steldt & Delahunt

[57] ABSTRACT

Substituted haloalkanesulfonanilides in which the sulfonamido nitrogen is optionally substituted by a cation, an alkyl group or a member of the group

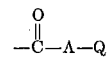

wherein A is oxygen or a carbon-carbon bond, Q is a lower alkyl group, the anilide phenyl and another phenyl are linked by a group selected from —CHOH—, —CHONCH$_2$—, —C(CH$_3$)OH— and —C(C$_6$H$_5$)OH — and the phenyl rings are optionally substituted. These compounds are physiologically active, for example as anti-inflammatory agents, anti-microbial agents or herbicides.

19 Claims, No Drawings

SUBSTITUTED HALOALKANESULFONANILIDES

This is a continuation-in-part of our copending application Ser. No. 28,130, filed Apr. 13, 1970 now abandoned.

This invention relates to substituted halokanesulfonanilides in which the sulfonamido nitrogen is optionally substituted by a cation, an alkyl group or a member of the group

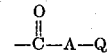

wherein A is oxygen or a carbon-carbon bond, Q is a lower alkyl group, the anilide phenyl and another phenyl are linked by a group selected from —CHOH-, —CHOHCH$_2$—, —C(CH$_3$)OH— and —C(C$_6$H$_5$)OH— and the phenyl rings are optionally substituted. These compounds are physiologically active, for example as anti-inflammatory agents, anti-microbial agents or herbicides.

Certain substituted haloalkanesulfonanilides are known. Thus, such compounds wherein the anilide ring is linked to a phenyl ring through a carbonyl group are known anti-inflammatory agents (see for example British Pat. No. 1,198,301). Unlike the compounds of the present invention, however, such compounds are highly aromatic and resonance stabilized since the two phenyl rings are linked by the pi electron-rich carbonyl group thus providing an extended conjugated system.

It is an object of the invention to provide compounds which are anti-inflammatory agents.

It is an object of the invention to provide compounds which are anti-microbial agents.

It is another object of the invention to provide compounds which modify the growth of plants, i.e. which prevent, alter, destroy or otherwise affect the growth of plants.

It is a further object of the invention to provide a method for controlling inflammation in mammalian tissue.

It is a further object of the invention to provide a method for controlling microorganisms.

It is a further object of the invention to provide a method for controlling unwanted plants.

It is still another object of the invention to provide anti-inflammatory compositions containing one or more substituted haloalkanesulfonanilides as active ingredients therein.

It is still another object of the invention to provide herbicidal compositions containing one or more haloalkanesulfonanilides as active ingredients therein.

Still other objects will be made apparent by the following specification.

DETAILED DESCRIPTION

According to the present invention, there is provided a class of compounds of the formula:

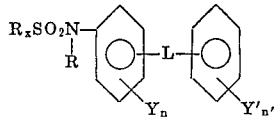

I wherein R$_x$ is a lower haloalkyl group having at least one halogen atom bonded to the alpha carbon atom, or two halogen atoms bonded to the beta carbon atoms, R is hydrogen, a pharmaceutically acceptable cation, alkyl of one or two carbon atoms or a member of the group

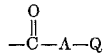

wherein A is oxygen or a carbon-carbon bond, Q is a lower alkyl radical, Y and Y' are independently selected from hydroxy, acetoxy, amino, halogen and alkyl or alkoxy of one to three carbon atoms, n and n' are independently zero, one or two and L is —CHOH, —CHOHCH$_2$—, —C(CH$_3$)OH— or —C(C$_6$H$_5$)OH— (in which C$_6$H$_5$ represents a phenyl ring). The invention also provides methods for the preparation of and use of the compounds.

The term lower when applied to substituent groups (radicals) of this invention refers to groups containing from one to four carbon atoms.

R$_x$ can be a straight or branched chain perhaloalkyl or partially halogenated alkyl radical, and the halogen can be fluorine or chlorine, preferably fluorine. As noted previously, R$_x$ should have at least one halogen bonded to the alpha carbon atom, or, if there is no halogen bonded to the alpha carbon atom, at least two halogens bonded to the beta carbon atom. The haloalkyl radicals may contain only one type of halogen (e.g. they may be fluoroalkyl), or the halogens may be mixed. When they are mixed it is preferable to have one or more fluorine atoms per chlorine. A preferred class of the compounds is those in which R$_x$ is perfluoroalkyl. Most preferred are compounds wherein R$_x$ is trifluoromethyl or difluoromethyl since these are generally most active as anti-inflammatory agents.

The radical R is preferably hydrogen or a pharmaceutically acceptable cation. Compounds wherein R is alkyl, or

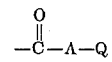

as defined above are generally less active than the corresponding compounds wherein R is hydrogen or a pharmaceutically acceptable cation, although they are often less toxic to mammalian species.

Compounds wherein the haloalkylsulfonamido group is oriented meta to the L group are also presently preferred as are compounds wherein L is —CHOH.

It appears that the active species is the compound wherein R is hydrogen, and that other R groups are converted to give the active species in vivo, although the invention is in no way limited by this theory. If a compound wherein R is other than hydrogen has a better therapeutic ratio (LD$_{50}$/ED$_{35}$) than the analogous compound wherein R is hydrogen, this compound may be preferred for therapeutic treatment.

Compounds of the invention wherein R is a pharmaceutically acceptable salt are mere variations of the basic active species. However, some provide advantages such as improved absorption, desirable solubility and stability characteristics, and other advantages known to those skilled in the art to be obtainable from such salts.

Compounds when n and n' are zero (i.e. in which the rings are unsubstituted except for the haloalkanesulfonamido and —L— groups) are preferred. However, when Y and/or Y' is halogen it is preferably fluorine or chlorine. Also, when Y or Y' is hydroxy or amino, $n$ and/or $n'$ are preferably one.

The compounds of the invention are acidic in nature when R is hydrogen. Consequently, they form salts, e.g. compounds of Formula I wherein R is a pharmaceutically acceptable cation. These are generally alkali metal (e.g. lithium, sodium and potassium), alkaline earth metal (e.g. barium, calcium and magnesium), other metal (e.g. aluminum, zinc and iron), ammonium and amine salts. The amine salts include the salts of aliphatic (e.g. alkyl), aromatic and heterocyclic amines, as well as those having a mixture of these types of structures. The amines useful in preparing the salts of the invention can be primary, secondary or tertiary and preferably contain not more than 20 carbon atoms.

The salts of the invention can be prepared by treating the acid form (compounds of Formula I in which R is hydrogen) with a stoichiometrically equivalent amount of an appropriate base under mild conditions.

Appropriate bases for use in preparing the metal salts include metal oxides, hydroxides, carbonates, bicarbonates and alkoxides. Some salts are also prepared by cation exchange reactions (by reacting a salt of the invention with an organic or inorganic salt in a cation exchange reaction). The organic amine salts include for example salts of morpholine, methyl cyclohexylamine, glucosamine, etc. These and the ammonium salts can be prepared by reacting the acid form with the appropriate organic base or ammonium hydroxide.

The salts of the invention are frequently formed by reacting the precursors in aqueous solution. This solution can be evaporated to obtain the salt of the compound, usually as a dry powder. In some cases, it may be more convenient to use a non-aqueous solvent such as alcohols, acetone, etc. The resulting solution is then treated to remove the solvent, for example, by evaporation under reduced pressure. Since many of the salts are water soluble, they are often used in the form of aqueous solutions. Also, they can be used in making pharmaceutical preparations in the form of capsules for oral administration.

Generally, compounds of the invention wherein R is hydrogen or alkyl and L is —CHOH— are prepared by reduction of the corresponding benzophenones according to the following scheme:

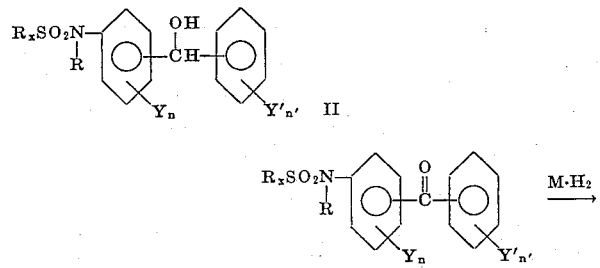

wherein $R_x$, Y, Y', $n$ and $n'$ are as previously defined and M·H$_2$ is a reducing reagent or combination of reagents. M·H$_2$ may be a complex metal hydride such as sodium borohydride, lithium aluminum hydride, a chemical reducing combination such as zinc and sodium hydroxide in ethanol or a catalytic reducing combination such as hydrogen and palladium on charcoal. It has been found that sodium borohydride is generally effective and sufficiently selective, and it is the preferred reducing agent.

The benzophenone to be reduced is dissolved in a suitable solvent for sodium borohydride reductions such as methanol, and then treated with a slight excess (up to 10 percent) of sodium borohydride in sodium hydroxide solution. It is generally preferable to carry out this addition below 10° C. to avoid vigorous exothermic reactions. The reaction may be run from 15 minutes up to several weeks at room temperature. Generally one day is sufficient reaction time at this temperature on a small scale reaction. Shorter reaction times are obtained at higher temperatures.

Preferably, the compounds of the invention wherein L is

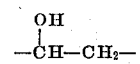

and R is hydrogen are prepared by condensation of alkali metal salts of formylhaloalkanesulfonanilides

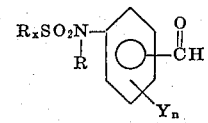    III with Grignard reagents, for example benzyl magnesium chloride, in a suitable solvent such as tetrahydrofuran. Compounds of the invention wherein L is —C(CH$_3$)OH— or —C(O)OH— and R is hydrogen are preferably prepared by reaction of alkali metal salts of benzophenones of Formula II with methyl or phenyl Grignard reagents, for example methyl magnesium iodide, methyl magnesium bromide, phenyl magnesium bromide and phenyl magnesium iodide.

Conventional methods of isolation of the products can be used. The basic solution is generally acidified and the product extracted into diethyl ether, dichloromethane and the like. Purification of the products may be accomplished by distillation, recrystallization, elution chromatography and the like. Oils are frequently obtained which resist crystallization or distillation, but chemical and spectral analysis may be used to confirm the structures of such oils.

In order to prepare the compounds of the invention wherein R is lower alkyl, compounds of Formula I wherein R is a metal ion, for example sodium or potassium can be reacted with a stoichiometric amount of alkyl bromide or iodide or a dialkyl sulfate in a suitable solvent such as acetone. Alternatively, metal salts of the corresponding intermediate benzophenones (Formula II) or formylhaloalkanesulfonamides (Formula III) can first be converted to the N-alkyl intermediates and these then reacted with reducing agents or Grignard reagents to form the N-alkyl compounds of Formula I.

The compounds of the invention in which R is

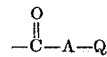

are preferably prepared by reacting compounds of Formula I wherein R is a metal ion with an acylating agent of Formula IV,

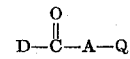

wherein Q and A are as previously defined and D is halogen, preferably fluorine, chlorine or bromine, or the residue of an anhydride, i.e. an acyloxy group. The compounds wherein R is

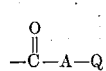

and L is —CHOH— can also be prepared by reduction of the corresponding intermediate N-substituted benzophenones, using reducing agents such as sodium borohydride or hydrogen and palladium on charcoal. A wide variety of acylating agents of Formula IV can be used in preparing the compound of the invention, including acyl halides or anhydrides, haloformates and the like. These compounds are either available directly, or in the case of certain chloroformates are easily prepared from phosgene and the appropriate alcohol.

The intermediate benzophenones of Formula II above wherein R is hydrogen are prepared by condensing an aminobenzophenone with a haloalkylsulfonyl halide or anhydride according to the following scheme:

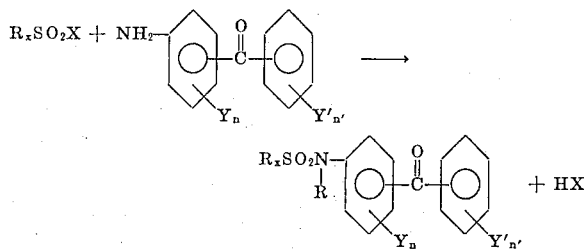

wherein $R_x$, $n$, $n'$, $Y$ and $Y'$ are as previously defined and X represents a halogen atom, preferably chlorine or fluorine, or the corresponding anhydride grouping —$OSO_2R_x$ ($R_x$ being defined as above). Approximately equivalent amounts of the reactants are brought together at temperatures most often ranging between about −15 and 150° C. If necessary or desirable, the reaction can be carried out in a pressure vessel. The reaction is preferably, but not necessarily, carried out in the presence of an acid acceptor such as the alkali or alkaline earth metal carbonates and bicarbonates or a tertiary amine such as pyridine, triethylamine or N,N-dimethylaniline. The amount of the acid acceptor can be varied widely; however, a 10 mole percent excess of that amount of base sufficient to bind the liberated strong acid (HX) is routinely employed.

The condensation is usually conducted in the presence of an appropriate inert organic solvent. Typical solvents suitable for this purpose are methylene chloride, chloroform, carbon tetrachloride, benzene, toulene, bis(2-methoxyethyl) ether, acetonitrile, nitromethane, and the like.

After reaction is complete, if the reaction solvent is not water miscible, the product mixture can be extracted with a dilute aqueous base solution. The product, in the form of a salt which is usually soluble in the aqueous layer, is precipitated therefrom by addition of a mineral acid such as hydrochloric or sulfuric acid, and collected by filtration. Alternatively the product mixture can be washed with aqueous hydrochloric acid, the solvent evaporated in vacuo, and the residue dissolved in a dilute aqueous base solution which is washed with dichloromethane and treated with decolorizing charcoal. The product, in the form of a salt, is then converted to the acid form and isolated as described above.

If the reaction solvent is water miscible, the product is generally obtained by dilution of the reaction mixture with water. The product, a solid or oil, is separated and purified by conventional methods. The compounds prepared according to the foregoing procedures are crystalline solids purified, in general, by recrystallization from aqueous alcohol, trichloroethylene, hexane, benzene-hexane mixtures and the like. Elution chromatography has also been found to be a useful purification technique.

The intermediate formylhaloalkanesulfonanilides

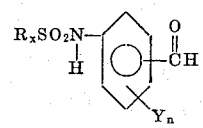

wherein $R_x$, Y and n are as previously defined are prepared from known compounds by sulfonylating the corresponding dialkoxymethylanilines by the general procedure used in preparing the benzophenones (II) and stirring the product with aqueous acid (HCl) to form the desired product in situ. Reaction conditions and methods of isolation and purification are also similar to those used in the preparation of the intermediate benzophenones.

An additional and preferred method of obtaining the benzophenones of Formula II in which Y or Y' is hydroxy is by cleavage of the alkoxy group of the comparable sulfonanilides in which the Y or Y' is alkoxy. This can be done conveniently with hydrogen iodide-acetic acid mixtures. Alternatively, other known ether cleavage methods, e.g. hydrobromic acid-acetic acid, may be used.

When R is hydrogen in the compounds of Formula II, this hydrogen is acidic in nature. Consequently, they readily form salts of alkali metals, alkaline earth metals, amines and the like. Many salts of the benzophenones are readily prepared by adding the stoichiometric amount of the selected base in inert solvent solution to the acidic compound. The resulting solution is treated to remove the solvent, e.g. by evaporation under reduced pressure.

Compounds of Formula II wherein R is alkyl are readily prepared by the reaction of the compounds of Formula II where R is hydrogen or a cation with an alkyl halide. This method for alkylation is known to the art.

Suitable haloalkanesulfonylanhydrides and halides (e.g. chlorides and fluorides) for use as starting materials in these procedures are known to the art, for example:

fluoromethanesulfonyl chloride,
fluorochloromethanesulfonyl chloride,
difluoromethanesulfonyl chloride,
dichloromethanesulfonyl chloride,
2,2,2-trifluoroethanesulfonyl chloride,
trifluoromethanesulfonyl chloride,
1,1,2,2-tetrafluoroethanesulfonyl chloride,
bromomethanesulfonyl chloride,
2,2,3,3-tetrafluoropropanesulfonyl chloride, 2-hydroperfluoropropanesulfonyl chloride,
and many others disclosed, e.g. in U.S. Pat. No. 2,732,398, and the Journal of the Chemical Society (London), 3058 (1960).

The aminobenzophenones used in producing the benzophenones of Formula II are generally described in the chemical literature or can be prepared from corresponding known substituted nitrobenzophenones by reduction. Any nitrobenzophenones or aminobenzophenones not specifically disclosed in the chemical literature are prepared by methods known in the literature for analogous compounds. Exemplary of such starting materials are:

5-amino-2-chlorobenzophenone,
3-amino-4'-fluorobenzophenone,
3-amino-5-bromobenzophenone,
3-amino-4'-ethylbenzophenone,
3-amino-2'-ethoxybenzophenone,
3-amino-4'-ethoxybenzophenone, etc.

As noted previously, the compounds of the present invention are effective anti-inflammatory agents and some also anti-microbial and herbicidal in activity. In each case, the activity has been observed using standard screening methods. The compounds of particular value as anti-microbial agents are those wherein R is hydrogen and $R_x$ is perhaloalkyl.

The anti-inflammatory activity can be conveniently demonstrated using assays designed to test the ability of these compounds to antagonize the local edema which is a characteristic of the anti-inflammatory response (rat foot edema test) and to inhibit the onset of the erythematous manifestation of inflammation (guinea pig erythema test).

The edema test is performed on adult female rats. One group of 10 rats serves as non-medicated controls, while another group of 10 rats receives the test compound at various times prior to the induction of the edema, usually 15 minutes, one hour and/or 18 hours. The test compound is administered as a suspension in 4 percent aqueous solution of acacia. Edema is induced by the plantar injection of 0.5 percent carrageenin (0.1 ml./foot) into the right hind foot. The left hind foot receives a like volume of 0.9 percent saline solution. Three hours later, the volume of each hind foot is determined plethysmographically. The edema is expressed as the increase in the volume of the edemogen injected foot (volume of the "edemogen foot" less the volume of the "saline foot"). The percent inhibition is calculated by dividing the mean percent increase in the edema of the edemogen foot of the medicated group, multiplied by 100. An active does is that giving a statistically significant inhibition of the induced edema, usually about 30–35 percent inhibition.

Leading references to this method are: plantar
1. Adamkiewicz et al., Canad. J. Biochem. Physio. 33:332, 1955;
Selye, Brit. Med. J. 2:1129, 1959; and
3. Winter, Proc. Soc. Exper. Biol. Med. 111:544, 1962.

The erythema test is performed on adult, albino guinea pigs of either sex weighing 400–600 g. Hair is removed from the abdomen of the animals by a depilatory mixture the afternoon of the day prior to the day on which they are to be used. One group of 5 animals serves as non-medicated controls, while another group of 5 receives the test compound 30 minutes prior to direct exposure to ultraviolet light. For induction of erythema, the animal is restrained on a small animal board. Three circular sections (6–8 mm. in diameter) of the ventrolateral abdominal area of the animal are then exposed to a controlled amount of ultraviolet radiation. Two hours after exposure, the erythema is scored 0–5 on the basis of intensity and completeness (full or partial circles). The maximal score per animal is 15. The percent inhibition is calculated on the basis of the mean score for the medicated group versus the non-medicated group. An active dose is taken to be that giving a statistically significant inhibition of the induced erythema, usually 35 40 percent inhibition. Modifications of this test include variation in the time and method of drug administration.

Leading references to this method are:
1. Wilhelmi, Schweiz. Med. Wschr. 79:577, 1949, and
2. Winder et al, Arch. Int. Pharmacodyn. 116:361, 1958.

The compounds of the invention are preferably administered orally for relief of symptoms of inflammatory conditions in mammals, for example as four percent acacia suspensions, but also may be administered parenterally. Amounts are generally about 1 to 500 mg./kg. of body weight of the mammal to be treated.

Anti-microbial activity of the compounds of the invention was determined using standard screening methods based on the methods disclosed by Vincent, J.G. and Vincent, Helen W., Proc. Soc. Exptl. Biol. Med. 55:162-164, 1944, and Davis, B.D., and Mingioli, E.S., Jour. Bact. 66:129-136, 1953.

The following examples are given for the purpose of further illustrating the present invention, but are not intended to limit the scope thereof. All melting points are uncorrected. All parts are by weight unless otherwise specified in the examples.

EXAMPLE 1

3-Benzoyldifluoromethanesulfonanilide (7.7 g., 0.025 mole) is dissolved in methanol (50 ml.), the solution cooled below 5° C. and treated with sodium borohydride (1.3 g., 0.030 mole) in 10 percent sodium hydroxide solution (25 ml.) over 30 minutes. The solution is stirred at room temperature for 1.5 hours, then diluted with water (50 ml.). The sodium salt of the substituted benzhydrol is not isolated but the solution is treated with 5 percent hydrochloric acid until acidic. The solution is extracted with dichloromethane, the extracts are dried over magnesium sulfate and the solvent removed in vacuo to give an oil. The oil crystallizes very slowly with scratching and cooling to 3'-(phenylhydroxymethyl)difluoromethanesulfonanilide, m.p. 77.5°–79° C. after recrystallization from cyclohexane.

| Analysis: | %C | %H | %N |
|---|---|---|---|
| Calculated for $C_{14}H_{13}F_2NO_3S$: | 53.7 | 4.2 | 4.5 |
| Found: | 53.7 | 4.1 | 4.4 |

EXAMPLE 2

3-Benzoyltrifluoromethanesulfonanilide (16.4 g., 50 mmoles) is dissolved in methanol (100 ml.) and the solution is cooled with an ice bath. The temperature is maintained at 3° to 7° C. while adding sodium borohydride (2.00 g., 52 mmole) in 10 percent sodium hydroxide solution (50 ml.). The mixture is stirred at room temperature overnight. The mixture is evaporated to near dryness in vacuo, then diluted with water (100 ml.). The salt is not isolated but the solution is acidified with concentrated hydrochloric acid (50 ml.) in water (50 ml.). This solution is extracted six times with dichloromethane (400 ml. total) and dried over magnesium sulfate. The solvent is evaporated in vacuo to an oil, then benzene (50 ml.) is added and the mixture is again evaporated in vacuo. The oil solidifies very slowly with scratching and cooling after elution chromatography on silica gel. Recrystallization, with decolorizing charcoal treatment, from 50/50 benzene/hexane again gives an oil which slowly crystallizes by scratching and cooling to a white solid, 3'-(phenylhydroxymethyl)trifluoromethanesulfonanilide, m.p. 67.5°–69° C.

Analysis:

|  | %C | %H | %N |
|---|---|---|---|
| Calculated for $C_{14}H_{12}F_3NO_3S$: | 50.8 | 3.7 | 4.2 |
| Found: | 51.4 | 3.7 | 4.4 |

The following compounds are prepared, using the method of Examples 1 and 2, from the corresponding benzophenones.

| Example No. | Compound | Melting Point (°C.) |
|---|---|---|
| 3. | 3'-(4-chlorophenylhydroxymethyl)trifluoromethanesulfonanilide | 91–92 |
| 4. | 3'-(4-methylphenylhydroxmethyl)trifluoromethanesulfonanilide | 65–67 |

Additional compounds prepared by the same method are set out in the following table together with the melting points of the immediate precursor benzophenones.

| Example No. | Benzophenone Melting Point (°C.) | Compound |
|---|---|---|
| 5. | 116–119 | 3'-(phenylhydroxymethyl)fluoromethanesulfonanilide |
| 6. | 133–136 | 4'-hydroxy-3'-(phenylhydroxymethyl)trifuloromethanesulfonanilide |
| 7. | 135–137 | 3'-(4-chloro-2-methlphenylhydroxymethyl)trifluoromethanesulfonanilide |
| 8. | oil | N-methyl-3'-(phenylhydroxymethyl)trifluoromethanesulfonanilide |
| 9. | oil | N-ethyl-3'-(phenylhydroxymethyl)trifluoromethanesulfonanilide |
| 10. | 105.5–107 | 3'-(phenylhydroxymethyl)-2,2,2-trifluoroethanesulfonanilide |
| 11. | 122.5–124.5 | 3'-(4-methoxyphenylhydroxymethyl)trifluoromethansulfonanilide |
| 12. | 118–120 | 3'-(4-methoxyphenylhydroxymethyl)difluoromethansulfonanilide |
| 13. | 116.5–118.5 | 3'-(4-methoxyphenylhydroxymethyl)fluoromethanesulfonanilide |
| 14. | 136–137 | 4'-(phenylhydroxymethyl)trifluoromethanesulfonanilide |
| 15. | 131–133 | 3'-(2-hydroxyphenylhydroxymethyl)trifluoromethanesulfonanilide |
| 16. | 118–120 | 3'-(4-methylphenylhydroxymethyl)fluoromethanesulfonanilide |
| 17. | 127–129 | 3'-(4-chlorophenylhydroxymethyl)difluoromethanesulfonanilide |
| 18. | 101–102 | 3'-(3-chlorophenylhydroxymethyl)trifluoromethanesulfonanilide |
| 19. | 72–74 | 3'-(2-chlorophenylhydroxymethyl)trifluoromethanesulfonanilide |
| 20. | 92–93 | 3'-(2-methylphenylhydroxymethyl)trifluoromethanesulfonanilide |
| 21. | 95–97 | 3'-(phenylhydroxymethyl)perfluoroethanesulfonanilide |
| 22. | 134–136 | 3'-(4-fluorophenylhydroxymethyl)trifluoromethanesulfonanilide |
| 23. | 106–108 | 4'-chloro-3'-(phenylhydroxymethyl)trifluoromethanesulfonanilide |
| 24. | 80–80.5 | 3'-(phenylhydroxymethyl)-2-hydroperfluoroethanesulfonanilide |
| 25. | 99–102 | 4'-chloro-3'-(phenylhydroxymethyl)difluoromethanesulfonanilide |
| 26. | 82–83 | 4'-chloro-3'-(4-chlorophenylhydroxymethyl)trifluoromethanesulfonanilide |
| 27. | 133–134 | 4'-chloro-3'-(4-fluorophenylhydroxymethyl)trifluoromethanesulfonanilide |
| 28. | 95–97 | 3'-(phenylhydroxymethyl)chloromethanesulfonanilide |
| 29. | 132–134 | 5'-amino-3'-(phenylhydroxymethyl)trifluoromethanesulfonanilide |

EXAMPLE 30

3'-(Phenylhydroxymethyl)trifluoromethanesulfonanilide is reacted with an equimolar amount of sodium hydroxide in acetone, then the solvent is removed in vacuo to give sodium 3'-(phenylhydroxymethyl)trifluoromethanesulfonanilide.

EXAMPLE 31

3-Benzoyltrifluoromethanesulfonanilide (16.5 g., 0.050 mole) is dissolved in ethanol (250 ml.) and reduced using hydrogen gas at about 45 psi and palladium on carbon. When hydrogen uptake ceases the solution is filtered, then the filtrate is evaporated to give 3'-(phenylhydroxymethyl)-trifuloromethanesulfonanilide as an oil. The product is purified by elution chromatography as described in Example 2.

EXAMPLE 32

N-ethoxycarbonyl-3-benzoyltrifluoromethanesulfonanilide (10 g., 0.025 mole) is dissolved in ethanol (150 ml.) and 1,2-dimethoxyethane (150 ml.) under a nitrogen atmosphere and sodium borohydride (0.47 g., 0.0125 mole) is added and the mixture is stirred overnight at room temperature. Solvents are evaporated and the residue is washed with 5 percent sodium hydroxide, 5 percent hydrochloric acid, then water. The residue is then extracted with benzene, the extracts are dried over magnesium sulfate and the solvent is removed in vacuo. The product is purified by elution chromatography on neutral alumina, eluting with hexane, hexane-benzene, benzene, dichloromethane, then ethanol. The second and third fractions are rechromatographed, then thoroughly dried to give a clear oil, N-ethoxycarbonyl-3-phenylhydroxymethyl-trifluoromethanesulfonanilide.

Analysis:

|  | %C | %H | %N |
|---|---|---|---|
| Calculated for $C_{17}H_{16}F_3NO_5S$: | 50.7 | 4.0 | 5.5 |
| Found: | 50.8 | 3.9 | 3.4 |

EXAMPLE 33

N-Propionyl-3-benzoyltrifluoromethanesulfonanilide is reduced according to the method of Example 33 to give N-propionyl-3-phenylhydroxymethyl-trifluoromethanesulfonanilide.

EXAMPLE 34

2-Benzoyltrifluoromethanesulfonanilide (27.7 g., 0.084 mole) is reduced according to the method of Example 31 to give 2-phenylhydroxylmethyl-trifluoromethanesulfonanilide, purified by elution chromatography and recrystallization from trichloroethylene to a white solid, m.p. 187.5°–188.5° C.

EXAMPLE 35

A solution of phenylmagnesium bromide in tetrahydrofuran is prepared from magnesium (1.22 g., 0.05 mole) and bromobenzene (7.85 g., 0.05 mole). To this solution is added over two hours (at room temperature) a solution of sodium 3-benzoyl-trifluoromethanesulfonanilide (17.6 g., 0.05 mole) in tetrahydrofuran (75 ml.). After three hours of additional stirring the slurry is concentrated by evaporation in vacuo, then the residue is treated with ten percent sulfuric acid (100 ml.). The mixture is extracted with diethyl ether and dichloromethane, the organic layers are combined and dried over magnesium sulfate, then concentrated by evaporation in vacuo to yield an oil. The oil is purified by chromatography on silica, eluting with trichloroethylene and benzene. The product is recrystallized twice from cyclohexane to give white crystals of 3-(diphenylhydroxymethyl)trifluorom ethanesulfonanilide, m.p. 108.5°–109.5° C.

Analysis

|  | %C | %H |
|---|---|---|
| Calculated for $C_{20}H_{16}F_3NO_3S$: | 59.1 | 4.0 |
| Found: | 59.2 | 4.1 |

EXAMPLE 36

3-Formyltrifluoromethanesulfonanilide (68.7 g., 0.27 mole) is converted to its sodium salt by stirring with 270 ml. of 1 N sodium hydroxide solution, then evaporating in vacuo to a tan powder, m.p. 226°–227° C. (dec.)

A solution of benzylmagnesium chloride in tetrahydrofuran is prepared from magnesium (3.64 g., 0.15 mole) and benzyl chloride (19.0 g., 0.15 mole). To this is added sodium 3-formyltrifluoromethanesulfonanilide (13.1 g., 0.05 mole) in tetrahydrofuran (50 ml.). The solution is distilled, removing the tetrahydrofuran. Benzene is added and the solution is cooled and washed with dilute sulfuric acid and the washings are then extracted with dichloromethane. The benzene and dichloromethane fractions are combined, then evaporated in vacuo. The residue is dissolved in dilute sodium hydroxide solution and this solution is extracted with dichloromethane, then acidified with concentrated hydrochloric acid, giving 3-(2'-phenyl-1'-hydroxyethyl)trifluoromethanesulfonanilide. Repeated recrystallization from benzene and treatment with decolorizing charcoal gives white crystals, m.p. 101.5°–103.5° C Analysis

|  | %C | %H | %N |
|---|---|---|---|
| Calculated for $C_{15}H_{14}F_3NO_3S$: | 52.2 | 4.1 | 4.1 |
| Found: | 51.9 | 4.3 | 4.0 |

EXAMPLE 37

Methyl magnesium bromide (0.075 mole) in tetrahydrofuran is treated with sodium 3-benzoyl-trifluoromethanesulfonanilide (16.3 g., 0.046 mole) in tetrahydrofuran. After stirring three hours the mixture is concentrated by evaporation in vacuo, the residue is treated with ten percent sulfuric acid, then extracted with diethyl ether and dichloromethane. The organic layers are combined, dired over magnesium sulfate, filtered and evaporated in vacuo. The residue is an oil, 3-(1'-phenyl-1'-hydroxyethyl)trifluoromethanesulfon anilide, which may be isolated as the triethylammonium salt.

3-(1'-phenyl-1'-hydroxyethyl)triflouromethanesulfonanilide is dissolved in diisopropyl ether, heated with excess triethylamine and the white solid is recrystallized twice from a mixture of isopropanol and diisopropyl ether to give triethylammonium 3-(1'-phenyl-1'-hydroxyethyl)trifluoromethanesulfonanilide, m.p. 124°–126° C.

Analysis

|  | %C | %H | %N |
|---|---|---|---|
| Calculated for $C_{15}H_{15}F_3NO_3S \cdot C_6H_{15}N$: | 56.3 | 6.75 | 6.3 |
| Found: | 56.7 | 6.6 | 6.4 |

The compound of this example has been found to be an active anti-microbial agent, but is not significantly active as an anti-inflammatory agent at a dose of 100 mg./kg.

What is claimed is:

1. A compound of the formula

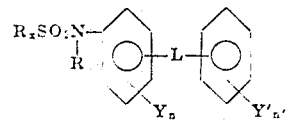

wherein $R_x$ is a lower haloalkyl group having at least one halogen atom bonded to the alpha carbon atom, or two halogen atoms bonded to the beta carbon atom, R is hydrogen, a pharmaceutically acceptable cation, alkyl of one or two carbon atoms or a member of the group

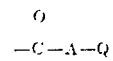

wherein A is oxygen or a carbon-carbon bond, Q is a lower alkyl radical, Y and Y' are independently selected from hydroxy, acetoxy, amino, halogen and alkyl or alkoxy of one to three carbon atoms, n and n' are independently zero, one or two and L is —CHOH—, —CHOHCH₂—, —C(CH₃)OH— or —C(C₆H₅)OH—.

2. A compound according to claim 1 wherein $R_x$ contains one carbon atom.

3. A compound according to claim 1 wherein $R_x$ is a fluoroalkyl group.

4. A compound according to claim 3 wherein $R_x$ is difluoromethyl.

5. 3'-(Phenylhydroxymethyl)difluoromethanesulfonanilide according to claim 4.

6. A compound according to claim 1 wherein $R_x$ is perfluoroalkyl.

7. A compound according to claim 6 wherein $R_x$ is trifluoromethyl.

8. 3'-(Phenylhydroxymethyl)trifluoromethanesulfonanilide according to claim 7.

9. A compound according to claim 1 wherein R is hydrogen.

10. A compound according to claim 1 wherein R is a pharmaceutically acceptable cation.

11. A compound according to claim 1 wherein R is

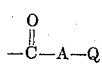

12. N-ethoxycarbonyl-3-phenylhydroxymethyl-trifluoromethanesulfonanilide according to claim 11.

13. A compound according to claim 1 wherein L is —CHOH—.

14. A compound according to claim 1 wherein L is —CHOHCH$_2$—.

15. 3-(2'-Phenyl-1'-hydroxyethyl)trifluoromethanesulfonanilide according to claim 14.

16. A compound according to claim 1 wherein L is —C(CH$_3$)OH—.

17. Triethylammonium-3-(1'-phenyl-1'-hydroxyethyl)trifluoromethanesulfonanilide according to claim 16.

18. A compound according to claim 1 wherein L is —C(C$_6$H$_5$)OH—.

19. 3-(Diphenylhydroxymethyl)trifluoromethanesulfonanilide according to claim 18.

* * * * *

UNITED STATES PATENT OFFICE
CERTIFICATE OF CORRECTION

Patent No. 3,689,523          Dated September 5, 1972

Inventor(s) Ronald J. Trancik, George G.I. Moore and Joseph Kenneth Harrington

It is certified that error appears in the above-identified patent and that said Letters Patent are hereby corrected as shown below:

In the heading under [73] "Minnesota Mining and Manufacturing Company, St. Paul, Minn." should be --Riker Laboratories, Inc., Northridge, California--

In the Abstract, "-CHONCH$_2$-" should be -- -CHOHCH$_2$- --

Column 1, line 5, "halokanesul-" should be --haloalkanesul- --

Column 3, lines 50-60, in the formula, the formulas are reversed

Column 4, line 32, "-C(O)OH-" should be -- -C(Ø)OH- --

Column 5, line 56, "toulene" should be --toluene--

Column 7, line 55, after "method are:" delete "plantar"

Column 7, line 58, --2.-- should be inserted before "Selye,Brit."

Column 8, line 13, "35  40" should be --35-40--

Column 9, line 42 under Compound, "trifuloromet" should be --trifluoromet --

Column 9, line 43 under Compound, "-2-methlphenyl-" should be -- -2-methylphenyl- --

Column 10, line 42, "-trifuloromethanesulfonanilide" should be -- -trifluoromethanesulfonanilide--

Column 12, line 50 in Claim 1, "-C-A-Q" should be -- -C-A-Q-- (with O double-bonded to C)

Column 13, lines 12-13 in claim 11, "-C-A-Q" should be -- -C-O-Q-- (with O double-bonded to C)

Signed and sealed this 8th day of May 1973.

ROBERT GOTTSCHALK
Commissioner of Patents